United States Patent [19]

Machado et al.

[11] Patent Number: 5,102,942

[45] Date of Patent: Apr. 7, 1992

[54] POLYKETONE POLYMER BLEND

[75] Inventors: Joseph M. Machado, Richmond; Eric R. George, Houston, both of Tex.

[73] Assignee: Shell Oil Company, Houston, Tex.

[21] Appl. No.: 452,079

[22] Filed: Dec. 18, 1989

[51] Int. Cl.⁵ .................................................. C08K 3/34
[52] U.S. Cl. .................................... 524/451; 524/612
[58] Field of Search ............ 524/425, 427, 449, 451, 524/445

[56] References Cited

U.S. PATENT DOCUMENTS

| | | | |
|---|---|---|---|
| 2,495,286 | 1/1950 | Brubaker | 260/63 |
| 3,694,412 | 9/1972 | Nozaki | 260/63 |
| 4,207,410 | 6/1980 | Burzin et al. | 528/288 |
| 4,252,920 | 2/1981 | Deleens et al. | 525/430 |
| 4,761,449 | 8/1988 | Lutz | 524/424 |
| 4,851,470 | 7/1989 | George | 524/612 |
| 4,874,819 | 10/1989 | George et al. | 525/185 |
| 4,874,825 | 10/1989 | Gergen | 525/425 |
| 4,880,903 | 11/1989 | VanBroekhoven et al. | 528/392 |

FOREIGN PATENT DOCUMENTS

| | | |
|---|---|---|
| 121965 | 10/1984 | European Pat. Off. . |
| 181014 | 5/1986 | European Pat. Off. . |
| 313170 | 2/1987 | European Pat. Off. . |
| 213671 | 3/1987 | European Pat. Off. . |
| 257663 | 3/1988 | European Pat. Off. . |
| 306116 | 5/1989 | European Pat. Off. . |
| 1081304 | 3/1965 | United Kingdom . |

Primary Examiner—Paul R. Michl
Assistant Examiner—Yong S. Lee
Attorney, Agent, or Firm—Denise Y. Wolfs

[57] ABSTRACT

Non-miscible ternary blends of a linear alternating polymer of carbon monoxide and at least one ethylenically unsaturated hydrocarbon with lesser amounts of mineral fillers and polyether esteramide polymers.

9 Claims, No Drawings

POLYKETONE POLYMER BLEND

FIELD OF THE INVENTION

This invention relates to an improved polymer blend comprising predominantly a linear alternating polymer of carbon monoxide and at least one ethylenically unsaturated hydrocarbon. More particularly, the invention relates to non-miscible ternary blends of the linear alternating polymer with a mineral filler, a polyether esteramide polymer, and, optionally, an acidic polymer containing moieties of an α-olefin and an α,β-ethlenically unsaturated carboxylic acid.

BACKGROUND OF THE INVENTION

The class of polymers of carbon monoxide and olefin(s) has been known for some time. Brubaker, U.S. Pat. No. 2,495,286, produced such polymers of relatively low carbon monoxide content in the presence of free radical initiators, e.g., peroxy compounds. G.B. 1,081,304 produced similar polymers of somewhat higher carbon monoxide content in the presence of alkylphosphine complexes of palladium salts as catalyst. Nozaki extended this process to produce linear alternating polymers in the presence of arylphosphine complexes of palladium moieties and certain inert solvents. See, for example, U.S. Pat. No. 3,694,412.

More recently, this class of linear alternating polymers has become of greater interest because of the greater availability of the polymers in quantity. These polymers, often referred to as polyketones or polyketone polymers, have been shown to be of the repeating formula —CO—(A)— wherein A is the moiety of unsaturated hydrocarbon polymerized through the ethylenic unsaturation. By way of further illustration, when the ethylenically unsaturated hydrocarbon is ethylene the polymer is represented by the repeating formula —CO—(CH$_2$—CH$_2$)—. The general process for the more recent production of such polyketone polymers is illustrated by a number of published European Patent Applications including 121,965, 181,014, 213,671, and 257,663. The process typically involves a catalyst composition formed from a compound of a Group VIII metal selected from palladium, cobalt or nickel, the anion of a strong non-hydrohalogenic acid and a bidentate ligand of phosphorus, arsenic or antimony.

The resulting polymers are relatively high molecular weight thermoplastics having established utility in the production of shaped articles such as containers for the food and drink industry and internal and external parts for the automotive industry, which articles are produced by processing the polymer according to known methods. For some particular applications it has been found to be desirable to have properties for a polymeric composition which are somewhat different from those of the polyketone polymers. It would be of advantage to retain the more desirable properties of the polyketone polymer and yet improve other properties. These advantages are often obtained through the provision of a polymer blend.

Semi-crystalline polymers, such as the polyketone polymer, often suffer from substantial mold shrinkage and high thermal expansion, limiting their utility in applications where dimensional stability is critical. One way to solve this problem is to add a mineral filler having a very low thermal expansion coefficient. However, the addition of a mineral filler will often compromise impact strength. This reduction in impact strength can be offset by including a second polymer, such as a polyether esteramide polymer.

SUMMARY OF THE INVENTION

The present invention relates to blends of a linear alternating polymer of carbon monoxide and at least one ethylenically unsaturated hydrocarbon with other polymeric material. More particularly, according to the invention, there are provided non-miscible ternary blends of the linear alternating polymer with a mineral filler and a polyether esteramide. Such blends exhibit improved dimensional stability while exhibiting good strength and impact resistance, relative to the linear alternating polymer with mineral filler alone. Inclusion of an acidic polymer containing moieties of an α-olefin and an α,β-ethlenically unsaturated carboxylic acid improves processability.

DESCRIPTION OF THE INVENTION

The polyketone polymers which are employed as the major component of the blends of the invention are linear alternating copolymers of carbon monoxide and at least one ethylenically unsaturated hydrocarbon. Suitable ethylenically unsaturated hydrocarbons which are useful as precursors of the polyketone polymers have up to 20 carbon atoms inclusive, preferably up to 10 carbons atoms inclusive, and are aliphatic such as ethylene and other alpha-olefins including propylene, butylene, isobutylene, 1-hexene, 1-octene and 1-dodecene, or are arylaliphatic having an aryl substituent on an otherwise aliphatic molecule, particularly an aryl substituent on a carbon atom of the ethylenic unsaturation. Illustrative of this latter class of ethylenically unsaturated hydrocarbons are styrene, p-methylstyrene, m-propylstyrene and p-ethylstyrene. Preferred polyketone polymers are copolymers of carbon monoxide and ethylene or terpolymers of carbon monoxide, ethylene and a second hydrocarbon of at least three carbon atoms, particularly an alpha-olefin such as propylene.

The structure of the polyketone polymers is that of a linear alternating polymer and the polymer will contain substantially one molecule of carbon monoxide for each molecule of ethylenically unsaturated hydrocarbon. When terpolymers of carbon monoxide, ethylene and a second hydrocarbon are employed as a blend component in the blends of the invention, there will be within the terpolymer at least two units incorporating a moiety of ethylene for each unit incorporating a moiety of the second hydrocarbon. Preferably there will be from about 10 to about 100 units incorporating a moiety of ethylene for each unit incorporating a moiety of the second hydrocarbon. The polymer chain will therefore be represented by the repeating formula

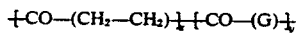

wherein G is the moiety obtained by polymerization of the second hydrocarbon through the ethylenic unsaturation and the ratio of y:x is no more than about 0.5. In the modification where copolymer of carbon monoxide and ethylene is employed as a blend component there will be no second hydrocarbon present and the polyketone polymer is represented by the above formula wherein y=0. When y is other than 0, i.e., terpolymers are employed, the —CO—(CH$_2$—CH$_2$)— units and the —CO—(G)— units are found randomly throughout the polymer chain, and ratios of y:x from about 0.01 to about 0.1 are preferred. The end groups or "caps" of the polymer chain will depend on what materials are present during the production of the polyketone and whether and how the polymer has been purified. The precise properties of the polymer will not depend upon the particular end groups to any considerable extent so that the polymer is fairly represented by the above formula for the polymer chain.

Of particular interest are the polyketones of number average molecular weight from about 1,000 to about 200,000, particularly those of number average molecular weight from about 20,000 to about 90,000 as determined by gel permeation chromatography. The physical properties of such polymers will depend in part on the molecular weight, whether the polymer is a copolymer or a terpolymer and, in the case of terpolymers the proportion of the second hydrocarbon present. Typical melting points for such polymers are from about 175° C. to about 300° C., preferably from about 210° C. to about 270° C. The polymers have a limiting viscosity number (LVN), measured in a standard capillary viscosity measuring device in m-cresol at 60° C., of from about 0.5 to about 8, preferably from about 0.8 to about 4.

A method of producing the polyketone polymers which is now becoming conventional is to contact the carbon monoxide and the unsaturated hydrocarbon(s) in the presence of a catalyst composition formed from a palladium compound, the anion of a non-hydrohalogenic acid having a pKa below about 6 and a bidentate phosphorus ligand. The scope of the production of polyketone is extensive but, without wishing to be limited, a preferred palladium compound is a palladium carboxylate, particularly palladium acetate, the preferred anion is the anion of trifluoroacetic acid or para-toluenesulfonic acid, and the preferred bidente ligand is 1,3-bis(diphenylphosphino)propane or 1,3-bis[di(2-methoxyphenyl)phosphino]-propane.

Polymerization is conducted in the gas phase in the substantial absence of reaction diluent or in a liquid phase in the presence of a reaction diluent such as an alkanol, e.g., methanol or ethanol. The reactants are contacted under polymerization conditions in the presence of a catalyst composition by conventional methods such as shaking or stirring in a reaction vessel. Suitable reaction temperatures are from about 20° C. to about 150° C., preferably from about 50° C. to about 135° C. Typical reaction pressures are from about 1 bar to about 100 bar, more often from about 10 bar to about 100 bar. Subsequent to reaction the polymer is recovered as by decantation or filtration. The polymer product may contain residues of the catalyst composition which are removed, if desired, by treatment with a solvent or a complexing agent which is selective for the residues.

The second component of the non-miscible ternary blends of the invention is a mineral filler, such as talc, clay, mica, silica, calcium carbonate, wollastonite, franklinite and/or mixtures thereof. Talc is expected to be particularly useful herein.

The mineral fillers to be used in the non-miscible blends of the invention will customarily be provided by the manufacturer with a coating of a sizing material or a coupling agent, which terms are often used interchangeably. For example, calcium carbonate may be coated with an acidic substance, such as stearic acid. The nature of the sizing or coupling agent will influence the interfacial shear strength of the mineral filler and the polymer matrix, i.e., the degree to which the polymer and filler will adhere. To contribute strength to a polymer blend, the interfacial shear strength will be at least comparable in magnitude to the shear strength of the polymer so that there will be good adhesion between the polymer and the mineral filler. The interfacial shear strength is influenced by the polarity of the polymer so that for some polymers certain sizings or coupling agents work better than others. For the case of blends containing polyketone polymers, a variety of sizings are suitable, particularly sizing designed and provided particularly for use with polar polymers. Sizings are generally characterized by the general nature of the size rather than the specific chemical structures which are often proprietary to the mineral filler manufacturer. Suitable sizings include water emulsions of starch and lubricating oil, aqueous dispersions of surface active materials and lubricants, silicon-containing materials such as vinyl silanes, alkyltrimethoxysilanes, amino silanes and, trimethoxysilanes which may also contain urethane, acrylate or epoxy functionalities, and non-polar hydrocarbons.

The mineral filler may aid to reduce and/or control mold shrinkage of the resultant polyketone polymer blend. Physical and thermal properties of the resultant polymer blend may be affected by the characteristics of the mineral fillers, such as the shape of the filler particles, the size of the filler particles, the size distribution of the filler particles, the surface area of the filler particles, and the surface preparation (i.e., sizing) of the filler particles. Talc is expected to significantly improve the dimensional stability of the polyketone polymer while providing the least reduction in impact strength, relative to other mineral fillers.

The third component of the ternary blends of the invention is a polyether esteramide polymer, e.g., a polymer incorporating a polyether portion and at least one other portion which contains ester linkages or amide linkages, or both. The polyether esteramide is a random copolymer or is a block copolymer so long as the polyether, ester and/or amide portions are contained within the polymer molecule. The particular structure of the polyether esteramide polymer will vary and will depend greatly upon the particular way the polyether esteramide polymer is produced.

In one modification, the polyether esteramide is produced by reacting (a) one or more compounds selected from omega-aminocarboxylic acids or lactams, the compounds having 10 or more carbon atoms, (b) an alpha, omega-dihydroxy(polyoxyalkylene oxide), particularly an alpha, omega-dihydroxy(polytetrahydrofuran), having an average molecular weight of from about 160 to about 3000, and (c) an organic dicarboxylic acid. The weight ratio of component (a) to the combination of components (b) and (c) should be from about 30:70 to about 98:2, based on total polymer.

Illustrative of the omega-amino-carboxylic acid and/or lactam of component (a) is caprolactam, lauryllactam, 12-aminododecanoic acid and 11-aminoundecanoic acid. Lauryllactam and 12-aminododecanoic acid are preferred. The diol of component (b) is a dihydroxy(polyoxyalkylene oxide), particularly an alpha, omega-dihydroxy(polytetrahydrofuran) having a molecular weight of from about 500 to about 1200. The dicarboxylic acids of component (c) are straight-chain dicarboxylic acids of from 6 to 13 carbon atoms inclusive. Such dicarboxylic acids include adipic acid, subenic acid, sebacic acid and dodecandioic acid. Dodecandioic acid is preferred.

The polyether esteramide is produced by heating the reactants in the presence of from about 2% by weight to about 30% by weight of the water, based on component (a) under internal pressure in a closed reactor at 230° to 300° C. After water is removed as steam, the mixture is maintained at 250° to 280° C. under normal or reduced pressure in the absence of oxygen. The resulting polymer is a random polymer in which the units of the starting compounds are randomly distributed along the polymer chain.

In a second and generally preferred modification, the polyether esteramide is a block copolymer comprising blocks of the polymer components, e.g., blocks of the esteramide component and the polyether component. Such block polyether esteramide polymers are represented by the repeating formula

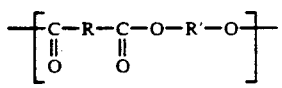

wherein R represents the polyamide moiety illustratively derived from a dicarboxylic polyamide by loss of the two terminal carboxyl groups and R' is the polyoxyalkylene moiety illustratively derived by loss of the two terminal hydroxyl groups from a polyoxyalkylene glycol.

The dicarboxylic polyamide is produced by methods known in the art such as polycondensation of one or more lactams and/or omega-aminoacids or by polycondensation of a dicarboxylic acid with a diamine. When the polyamide portion is produced from lactams or aminoacids, it is preferred that the lactam or aminoacid contain a straight-chain alkylene moiety of from 4 to 11 carbon atoms inclusive, as illustrated by caprolactam, lauryllactam, 12-aminododecanoic acid and 11-aminoundecanoic acid. Lauryllactam and 12-aminododecanoic acid are preferred. When the polyamide portion is produced from a diamine and a dicarboxylic acid, the preferred diamines are straight-chain diamines of from 4 to 12 carbon atoms inclusive, particularly hexamethylenediamine and nonamethylenediamine. The preferred dicarboxylic acids have from 4 to 12 carbon atoms inclusive and are illustrated by adipic acid, azelic acid, sebacic acid and dodecanedioic acid. The polyamide portion is produced by contacting the reactants, often in the presence of an excess of dicarboxylic acid to limit the chain length of the polyamide portion. Good results are obtained if the dicarboxylic polyamide has an average molecular weight of from about 300 to about 15,000, preferably from about 800 to about 5000.

The polyoxyalkylene glycol portion comprises linear or branched polyoxyalkylene glycols wherein the alkylene moiety has at least two carbon atoms, e.g., polyoxyethylene glycol, polyoxypropylene glycol or polyoxytetramethylene glycol as well as copolymers of such glycols. Polyoxytetramethylene glycol is preferred. The average molecular weight of the polyoxyalkylene glycol is suitably from about 100 to about 6000, but preferably is from about 200 to about 3000.

The weight ratio of the polyoxyalkylene glycol to the dicarboxylic polyamide is from about 5:95 to about 85:15, based on total polymer, but preferably is from about 10:90 to about 50:50 on the same basis. The reaction of the polyoxyalkylene glycol portion and the dicarboxylic polyamide portion is conducted in the molten state, e.g., from about 100° C. to about 400° C., in the presence of an alkoxide catalyst which is preferably a zirconium, titanium, or hafnium tetraalkoxide wherein each alkyl independently has up to 24 carbon atoms. The reactant contact is maintained by vigorous agitation, such as by stirring, at a reduced pressure on the order of from about 0.05 mm to about 5 mm Hg.

The production of polyether esteramides is well known in the art and is described in more detail by Burzin, U.S. Pat. No. 4,207,410, in the case of random polymers and by Deleens, U.S. Pat. No. 4,252,920 in the case of block copolymers. Certain of the polyether esteramides are commercially available and are marketed by Atochem Inc., Polymers Division under the tradename PEBAX®.

The blends of the invention comprise a major proportion of the polyketone polymer with lesser amounts of mineral filler and polyether esteramide. The precise proportion of the polyether esteramide polymer is not critical and amounts of polyether esteramide polymer from about 0.5% by weight to about 45% by weight, based on total blend, are satisfactory. Amounts of polyether esteramide from about 1% by weight to about 20% by weight on the same basis are preferred. Amounts of the mineral filler can be from about 0.1% by weight to about 45% by weight, based on total blend, with amounts from about 10% by weight to about 40% by weight, being preferred.

Additionally, a fourth component may optionally be added to these essentially ternary blends. The optional, fourth component of the blends of the invention, present as a minor component if present at all, is an acidic polymer containing moieties of an α-olefin and an α,β-ethylenically unsaturated carboxylic acid, optionally polymerized with a third monomer and optionally having a portion of the carboxylic acid groups neutralized with non-alkali metal. The α-olefin monomer of this optional blend component is an α-olefin of up to 10 carbon atoms inclusive such as ethylene, propylene, 1-butene, isobutylene, 1-octene and 1-decane. Preferred α-olefins are straight chain α-olefins of up to 4 carbon atoms inclusive and most preferred is ethylene. The α-olefin monomer of this optional blend component is present in at least 65% by mole based on total component and is preferably present in at least 80% by mole on the same basis.

The ethylenically unsaturated carboxylic acid monomer is an α,β-ethylenically unsaturated carboxylic acid of up to 10 carbon atoms inclusive and is illustrated by acrylic acid, 2-hexenoic acid and 2-octenoic acid. The preferred α,β-ethylenically unsaturated carboxylic acids have up to 4 carbon atoms inclusive. These acids are acrylic acid, methacrylic acid and crotonic acid, of which acrylic acid and methacrylic acid are particularly preferred. The unsaturated acid monomer of the optional fourth blend component is present in an amount from about 1% by weight to about 35% by weight based on total blend component, but amounts from about 5% by mole to about 20% by mole on the same basis are preferred.

The acidic polymeric optional blend component is suitably a copolymer of the α-olefin and the unsaturated carboxylic acid and in general such copolymers are preferred. On occasion, however, it is useful to incorporate as an optional third monomer a non-acidic, low molecular weight polymerizable monomer of up to 8 carbon atoms inclusive. Such optional monomer may be another α-olefin such as propylene or styrene when the major α-olefin monomer is ethylene, an unsaturated ester such as vinyl acetate, methyl acrylate or ethyl methacrylate, an unsaturated halohydrocarbon such as vinyl fluoride or vinyl chloride, or an unsaturated nitrile such as acrylonitrile. As previously stated the presence of this third monomer is optional and is not required. Amounts of third monomer up to about 5% by mole, based on total optional blend component polymer are satisfactory with amounts up to about 3% by mole on the same basis being preferred.

Independent of whether the polymer of the optional fourth blend component is a copolymer or a terpolymer, in an optional embodiment of the fourth polymeric blend component a portion of the carboxylic acid groups is neutralized with non-alkali metal. When partially neutralized, this optional blend component is polymeric in form while exhibiting ionic character and is conventionally referred to as a metal ionomer. In the partially neutralized embodiment of the optional polymeric blend component the α-olefin/unsaturated carboxylic acid polymer, with or without the optional third monomer, is reacted with a source of ionizable zinc, aluminum or magnesium compound sufficient to neutralize from about 10% to about 90%, preferably from about 20% to about 80%, of the carboxylic acid groups present in the polymer. Such neutralization, particularly with zinc the preferred metal, results in a uniform distribution of metal throughout the polymer. The ionizable metal compound utilized in the neutralization is a source of complexed or uncomplexed non-alkali metal ions including zinc, aluminum or magnesium ions which are provided in compounds of the type known as metal salts, e.g., uncomplexed metal ion salts such as zinc acetate, zinc chloride or zinc formate, or complexed metal ion salts in which the metal is bonded to two types of groups, at least one of which is readily ionizable and the other is not. Illustrative of such complexed metal ion salts are mixed zinc salts with one weak acid such as oleic acid or stearic acid and one more ionizable acid such as acetic acid or formic acid. In general, neutralization with a complexed non-alkali metal ion is preferred.

The optionally partially neutralized polymers employed as the optional polymeric blend component are broadly conventional and many are commercial. Copolymers of ethylene and methacrylic acid are marketed by DuPont under the trademark NUCREL® and copolymers of ethylene and acrylic acid are marketed by Dow under the trademark PRIMACORE®. Partially neutralized polymers are marketed by DuPont under the trademark SURLYN®. The amount of the optional fourth polymeric will suitably be up to about 10% by weight based on the total polymer blend. Amounts of the optional blend component up to about 5% by weight on the same basis are preferred.

The method of producing the non-miscible blend of the polyketone polymer, mineral filler, and polyether esteramide polymer is not material so long as relatively uniform distributions of mineral filler and polyether esteramide polymer throughout the polyketone are obtained. The ternary blend is a non-miscible blend, with the mineral filler and polyether esteramide existing as discrete phases in the polyketone matrix. The blend will therefore not be homogeneous, but good results are obtained when the distributions of the added components are substantially uniform.

The method of blending the components is that which is conventional for non-miscible polymeric materials. In one modification the blend components in particulate form are mixed and passed through an extruder to produce the blend as an extrudate. In an alternate modification, the components are blended in a mixing device which exhibits high shear. In a preferred modification, the mineral filler and polyether esteramide polymer are premixed, in an extruder or in a batch mixing device, then the premixed blend is combined with the polyketone polymer, either in a separate extruder or mixing device, or by adding the polyketone polymer downstream into the same extruder. Premixing the mineral filler and polyether esteramide provides improved impact properties, consistent with a hypothesis that the polyether esteramide provides a tough, well-adhering interphase between the polyketone matrix and filler particles. This requires complete wetting of the filler surface by the polyether esteramide, which is facilitated by the premixing technique described above.

The blends of the invention may also contain conventional additives such as antioxidants, stabilizers, fire retardant materials, mold release agents and other substances which are added to improve the processability of the polymer components or to improve the properties of the resulting blend. Such additives are added prior to, together with, or subsequent to the blending of the polyketone polymer, mineral filler, and polyether esteramide polymer.

The blends of the invention are characterized by improved dimensional stability (relatively low thermal expansion and mold shrinkage), relative to the neat polyketone polymer, and good impact strength, relative to the filled polyketone without the polyether esteramide polymer. The blends are therefore of particular utility where articles are to be produced which require good dimensional stability and impact resistance over a wide temperature range. The blends are processed by conventional methods such as injection molding and extrusion into sheets, films, plates, fibers and shaped articles. The formed polymer articles find utility in the packaging industry, in the production of shaped containers such as for food or drink, and in the production of external and internal parts for automotive applications, such as automotive body panels.

The invention is further illustrated by the following Examples which should not be construed as limiting.

EXAMPLE 1

A Terpolymer of carbon monoxide, ethylene and propylene was produced in the presence of a catalyst composition formed from palladium acetate, trifluoroacetic acid and 1,3-bis[di(2-methoxyphenyl)-phosphino]propane. The terpolymer has a melting point of 220° C. and an LVN, measured in m-cresol at 60° C., of 1.7 dl/g. The polyketone polymer contained 1 pph NUCREL® 535 as a melt processing aid.

EXAMPLE 2

Various blends of the polyketone terpolymers of Example 1 were prepared to contain 10 to 30 wt % Micropflex 1200 talc filler, obtained from pfizer, and from 0 to 16 wt % PEBAX® 2533 elastomer, obtained from Atochem. Specific compositions are provided in Table 1. The blends were prepared in a Haake 30 mm twin screw extruder, operated at 200 RPM and melt temperatures of about 255° C. to 265° C. Molding was performed in a 25 ton Arburg injection molding machine at a temperature of about 265° C. The samples formed were 125 mils thick, and they were stored over desiccant prior to testing. Sample H was found to be not processable.

TABLE 1

SAMPLE COMPOSITIONS (wt %)

| Sample | Polyketone Polymer | Micropflex 1200 Talc | PEBAX ® 2533 Elastomer |
|---|---|---|---|
| A | 80 | 20 | 0 |
| B | 76 | 20 | 4 |
| C | 72 | 20 | 8 |
| D | 68 | 20 | 12 |
| E | 64 | 20 | 16 |
| F | 90 | 10 | 0 |
| G | 81 | 10 | 9 |
| H | 70 | 30 | 0 |
| I | 63 | 30 | 7 |
| J | 56 | 30 | 14 |

Impact properties of the "dry as molded" samples are shown in Table 2. Notched Izod values at 23° C. increase steadily with PEBAX ® 2533 content, reaching a value of over 5 ft-lb/in at 20 wt % talc and 12 wt % PEBAX ® 2533, and a value of over 7 ft-lb/in at 10 wt % talc and 9 wt % PEBAX ® 2533. Notched Izod values at −29° C. exhibit maximums of about 2 ft-lb/in at both 20 wt % talc and 8 wt % PEBAX ® 2533, and 10 wt % talc and 9 wt % PEBAX ® 2533. Gardner impact measurements at both 23° C. and at −30° C. show maximum values for the sample containing 8 wt % PEBAX ® 2533 of those containing 20 wt % talc, indicating that this is a particularly preferred composition. The Gardner impact specimen containing 8 wt % PEBAX ® 2533 and 20 wt % talc also exhibited ductile, localized failure, which is a desirable property. The two samples containing 10 wt % talc, both with and without PEBAX ® 2533, also demonstrated high Gardner impact at 23° C.

TABLE 2

IMPACT PROPERTIES

| Sample | Notched Izod (ft-lb/in) 23° C. | −29° C. | Gardner Impact (in-lb) 23° C. | −30° C. |
|---|---|---|---|---|
| A | 3.24 | 1.38 | 156 | 46 |
| B | 3.83 | 1.77 | 186 | 42 |
| C | 4.53 | 1.94 | 189 | 65 |
| D | 5.37 | 1.89 | 156 | 20 |
| E | 5.28 | 1.70 | 147 | 38 |
| F | 3.78 | 1.42 | 381 | — |
| G | 7.21 | 2.15 | 373 | — |
| I | 2.37 | 1.25 | 46 | — |
| J | 2.88 | 1.49 | 66 | — |

The tensile properties of the samples are provided in Table 3. The flexural modulus is defined as the secant modulus at 1% strain. The flexural modulus decreases from about 450,000 psi to about 250,000 psi as the PEBAX ® 2533 content increases from 0 wt % to 16 wt %. The tensile yield stress also decreases steadily with increasing PEBAX ® 2533 content. Some compromise in strength and stiffness occurred with increasing PEBAX ® content, but the effects are not excessive. The ultimate elongation remains relatively unaffected by PEBAX ® 2533 content.

TABLE 3

TENSILE AND FLEXURAL PROPERTIES

| Sample | Flexural Modulus (psi) | Yield Stress (lb/in$^2$) | Elongation (%) |
|---|---|---|---|
| A | 441,000 | 9300 | 72 |
| B | 367,000 | 8320 | 80 |
| C | 320,000 | 7790 | 69 |
| D | 292,000 | 7140 | 75 |
| E | 247,000 | 6350 | 55 |

EXAMPLE 3

Blends of the polyketone terpolymer of Example 1 were prepared in a manner similar to that of Example 2 to contain 20 wt % Micropflex 1200 talc filler, with and without 8 wt % PEBAX ® 2533 elastomer. A 500 ton Cincinnati-Milacron injection molding machine was used to prepare 7 in. × 30 in. panels of the blend samples. The melt temperature was 270° C., and mold temperature was 132° C. The panels formed were 100 mils and 150 mils thick.

Gardner impact measurements are shown in Table 4. The results indicate a significant increase in Gardner impact strength when 8 wt % PEBAX ® 2533 is included in a talc filled polyketone panel.

TABLE 4

IMPACT PROPERTIES

| Sample | Composition (wt %) Polyketone | Talc | PEBAX ® | Panel Thickness (mils) | Gardner Impact (in-lb) 23° C. | −30° C. |
|---|---|---|---|---|---|---|
| A | 80 | 20 | 0 | 100 | 30 | 10 |
| B | 72 | 20 | 8 | 100 | 200 | 22 |
| C | 80 | 20 | 0 | 150 | 57 | 24 |
| D | 72 | 20 | 8 | 150 | >400 | 71 |

EXAMPLE 4

Two identical blends of the polyketone terpolymer of Example 1 were prepared in a manner similar to that of Example 2 to contain 20 wt % Micropflex 1200 talc filler and 12 wt % PEBAX ® 2533 elastomer. In the first blend, the components were all dry blended together and compounded in a single pass through the extruder. In the second blend, the talc and PEBAX ® were first compounded together in the appropriate ratio and then this premixed blend was further compounded with the polyketone polymer. The properties of the two blends are compared in Table 5. Although the Izod values do not differ appreciably, the Gardner impact strengths at ambient and at low temperatures are improved by a factor of two as a result of premixing. The elongation to break also increases slightly. The advantage to this strategy is thus clearly demonstrated.

TABLE 5

EFFECT OF PREMIXING ON PROPERTIES

| Property | Single Step Extrusion | Talc and PEBAX ® Premixed |
|---|---|---|
| Notched Izod (Room Temp.) | 5.37 ft-lb/in | 4.75 ft-lb/in |
| Notched Izod (−29° C.) | 1.89 ft-lb/in | 1.98 ft-lb/in |
| Gardner Impact (Room Temp.) | 156 in-lb | 307 in-lb |
| Gardner Impact (−30° C.) | 20 in-lb | 77 in-lb |
| Tensile Elongation | 75% | 91% |

What is claimed is:

1. A composition comprising a non-miscible blend of (1) a major proportion of a linear alternating polymer of carbon monoxide and at least one ethylenically unsaturated hydrocarbon, wherein the linear alternating polymer is represented by the repeating formula

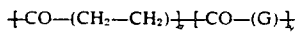

wherein G is a monomer of an ethylenically unsaturated hydrocarbon of at least 3 carbon atoms polymerized through the ethylenic unsaturation and the ratio of y:x is no more than about 0.5;

(2) from about 10 wt % to about 40 wt %, based on total blend, of a talc filler; and (3) a polyether esteramide polymer.

2. The composition of claim 1 wherein y is zero.

3. The composition of claim 1 wherein G is a moiety of propylene and the ratio of y:x is from about 0.01 to about 0.1.

4. The composition of claim 1 wherein the polyether esteramide is present in an amount from about 1 wt % to about 20 wt % of the total blend.

5. The composition of claim 1 including as an additional component an acidic polymer of ethylene and acrylic acid or methacrylic acid, wherein the acidic polymer is present in an amount of up to about 10 wt %, based on total blend.

6. The composition of claim 5 wherein the acidic polymer has from about 10% to about 90% of the carboxylic acid groups neutralized with zinc, aluminum, or magnesium.

7. A composition comprising a non-miscible blend of a linear alternating polymer represented by the repeating formula

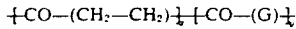

wherein G is a moiety of propylene and the ratio of y:x is no more than about 0.5, present as a major component in the blend;

from about 10 wt % to about 20 wt %, based on total blend, of a polyether esteramide block copolymer represented by the repeating formula

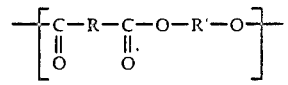

wherein R is the polyamide moiety derived by loss of the two terminal carboxyl groups from a dicarboxylic polyamide of average molecular weight from about 300 to about 15,000, and R' is the polyoxyalkylene moiety derived by loss of the two terminal hydroxyl groups of a polyoxyalkylene glycol of a molecular weight from about 100 to about 6000;

from about 10 wt % to about 40 wt %, based on total blend, of talc; and up to about 10 wt %, based on total blend, of an acidic polymer that is a non-neutralized copolymer of ethylene and acrylic acid or methacrylic acid.

8. A process for preparing a non-miscible polymer blend with improved impact properties comprising:

mixing a mineral filler with a polyether esteramide polymer to form a premixed polymer blend; and blending the premixed polymer blend with a linear alternating polymer of carbon monoxide and at least one ethlenically unsaturated hydrocarbon to form a non-miscible polymer blend with improved impact properties.

9. The process of claim 8 wherein the linear alternating polymer is represented by the repeating formula

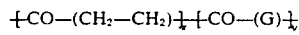

wherein G is a moiety of propylene and the ratio of y:x is no more than abut 0.5, the mineral filler is talc, and the polyether esteramide is a block copolymer represented by the repeating formula

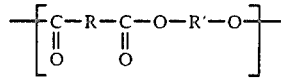

wherein R is the polyamide moiety derived by loss of the two terminal carboxyl groups from a dicarboxylic polyamide of average molecular weight from about 300 to about 15,000, and R' is the polyoxyalkylene moiety derived by loss of the two terminal hydroxyl groups of a polyoxyalkylene glycol of a molecular weight from about 100 to about 6000.

* * * * *